United States Patent
Janke et al.

(10) Patent No.: US 7,911,355 B2
(45) Date of Patent: Mar. 22, 2011

(54) APPARATUS FOR STORING AND WIRELESSLY TRANSMITTING DATA

(75) Inventors: Marcus Janke, Munich (DE); Bernhard Lippmann, Bruckberg (DE)

(73) Assignee: Infineon Technologies AG (DE)

( * ) Notice: Subject to any disclaimer, the term of this patent is extended or adjusted under 35 U.S.C. 154(b) by 991 days.

(21) Appl. No.: 11/696,535

(22) Filed: Apr. 4, 2007

(65) Prior Publication Data

US 2007/0290858 A1 Dec. 20, 2007

(30) Foreign Application Priority Data

Apr. 4, 2006 (DE) .................. 10 2006 015 782

(51) Int. Cl.
*G08B 21/00* (2006.01)
*G08B 13/14* (2006.01)
*G06K 19/06* (2006.01)

(52) U.S. Cl. ............... 340/686.4; 340/572.8; 340/686.1; 340/687; 235/492

(58) Field of Classification Search ............ 340/572.8, 340/686.1, 687, 686.4; 235/492
See application file for complete search history.

(56) References Cited

U.S. PATENT DOCUMENTS

| | | | | |
|---|---|---|---|---|
| 6,121,544 A | * | 9/2000 | Petsinger | 174/353 |
| 6,146,777 A | * | 11/2000 | Waller | 428/507 |
| 6,863,220 B2 | | 3/2005 | Selker | |
| 7,671,721 B2 | * | 3/2010 | Seppa | 340/10.34 |
| 2002/0170974 A1 | * | 11/2002 | Kashima | 235/492 |
| 2003/0016136 A1 | * | 1/2003 | Harvey | 340/686.1 |
| 2004/0012496 A1 | * | 1/2004 | De Souza et al. | 340/572.3 |
| 2004/0176032 A1 | * | 9/2004 | Kotola et al. | 455/41.2 |
| 2005/0236489 A1 | * | 10/2005 | Droz | 235/487 |
| 2007/0090954 A1 | * | 4/2007 | Mahaffey | 340/572.3 |
| 2007/0138297 A1 | * | 6/2007 | Sickert et al. | 235/492 |
| 2007/0205953 A1 | * | 9/2007 | Bombay et al. | 343/841 |
| 2008/0169901 A1 | * | 7/2008 | Timm et al. | 340/5.81 |

FOREIGN PATENT DOCUMENTS

| | | |
|---|---|---|
| DE | 19630611 | 11/1997 |
| DE | 197 42 126 | 3/1999 |
| DE | 19913093 | 10/2000 |
| DE | 102004041397 | 12/2005 |
| DE | 202005013346 | 3/2006 |
| WO | WO-9954843 | 10/1999 |

* cited by examiner

*Primary Examiner* — Benjamin C Lee
*Assistant Examiner* — Andrew Bee
(74) *Attorney, Agent, or Firm* — Dickstein Shapiro LLP

(57) ABSTRACT

A data storing apparatus that wirelessly transmits data, wherein the apparatus is deformable so as to block wireless transmission of data when the apparatus is in the deformed state.

7 Claims, 2 Drawing Sheets

APPARATUS FOR STORING AND WIRELESSLY TRANSMITTING DATA

CROSS-REFERENCE TO RELATED APPLICATION

This application claims priority to German Patent Application Serial No. 102006015782.6, which was filed Apr. 4, 2006, and is incorporated herein by reference in its entirety.

BACKGROUND OF THE INVENTION

The present invention relates to a data storage medium, in particular a personal identification document.

So-called contactless data storage media, in particular chip cards, have been used for some time in access control systems, for example. A further field of use is the use of the contactless data storage media in the form of wristwatches for accessing ski lifts. These so-called RFID tags are also already used in supermarkets nowadays in order to implement the contactless electronic checkout without the use of staff.

The SmartShield, which represents a type of Faraday cage that is placed around the antenna and shields the latter, is known for the purpose of shielding against unauthorized reading of RFID tags. It is thus a shield. It is also known practice to use a pushbutton or a switch in a chip card to interrupt operation. To this end, a button must be additionally pushed in order to activate or read the chip card.

Another planned field of use is the use of these RFID tags in passports, driving licenses, identity cards, for example, in order to increase anticounterfeit security. However, communication between the passport or RFID tag and the reader can be disadvantageously concomitantly recorded or read by unauthorized parties with little technical complexity.

Communication between the RFID tag and the reader is protected using the so-called challenge response method. In this case, part of the secure key for coding/decoding is stored in the MRS (Machine Readable Sector).

Nowadays, there is the problem that, in the case of unauthorized decryption of this method, passports or other confidential personal documents can be easily read without the owner's knowledge. It is then possible to access all of the confidential data of the passport even if the latter is in a jacket pocket, handbag, suitcase etc. The attacker must thus merely position his "attack reader" in the vicinity of the document to be read and read the desired data.

BRIEF DESCRIPTION OF THE DRAWINGS

The invention will be explained in more detail below with reference to exemplary embodiments and with the aid of figures, in which.

DESCRIPTION OF THE INVENTION

In one embodiment, it is not possible to transmit data in the folded state. To this end, the apparatus can be activated when unfolding the apparatus. This can be effected by the apparatus having an antenna coil whose reception and transmission sensitivity is reduced in the folded state. For example, the reception and transmission sensitivity can be reduced by reducing the effective area of the antenna coil relative to the external field when folding.

In another refinement, the apparatus has a first, outer envelope section and a second, inner internal section which can be displaced relative to the outer section. The transmission of data is blocked when the inner envelope section has been pushed in, for example.

The interruption in data transmission can then be activated or canceled by pulling out the inner envelope section as far as a stop. In one embodiment, the stop simultaneously forms contacts between the envelope sections and connects an antenna in the outer envelope section to a data storage device in the inner envelope section.

A further embodiment involves integrating a light sensor in the apparatus, the sensor blocking transmission when the illumination intensity is below a limit value. For example, an opaque cover can ensure that the limit value for blocking data transmission is reliably undershot in a particular form state of the apparatus by virtue of the cover preventing the incidence of light on the light sensor. In this form state, data transmission is thus prevented.

The apparatus may also have an energy receiving antenna. This can be used to supply the apparatus with energy that is induced via the antenna and to simultaneously ensure bidirectional data interchange.

Specifically, the apparatus constitutes, in particular, a card containing personal data, for example an identity card, passport, driving license, medical insurance card etc.

Each of these types of apparatus can be additionally provided with an optional cash card function which is known per se. When combined with a cash card function, blocking of data transmission in a particular form state of the apparatus can also be extended to the cash card function, with the result that cash card transactions are prevented in a particular form state of the apparatus.

Figure 1:
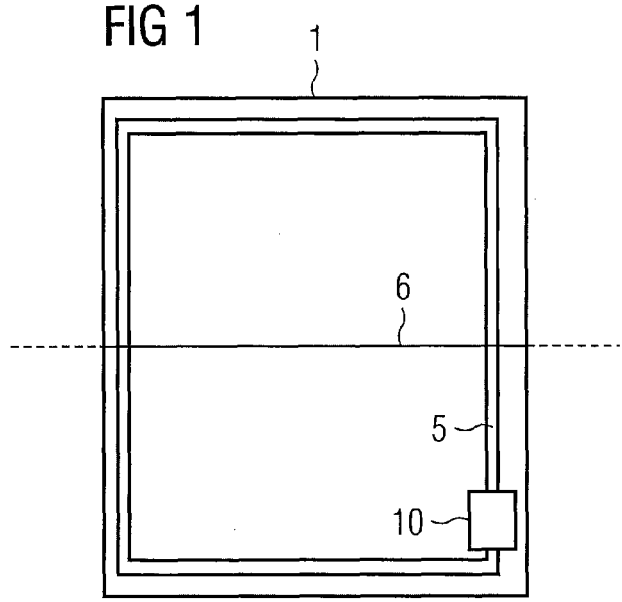
FIG. 1 shows a basic illustration of an inventive foldable data storage medium.

As shown in FIG. 1, a foldable data storage medium 1 according to an embodiment has an antenna coil 5 and a semiconductor chip 10. Memory units, for example an EEPROM, and logic circuits such as a microprocessor are integrated in the semiconductor chip 10 in a known manner. Data can be stored in the EEPROM in a known manner. The antenna coil 5 is connected to the semiconductor chip 10 for the purpose of transferring energy to the latter and for the purpose of bidirectional data transmission from and to the semiconductor chip. The data storage medium is generally stored in the folded state. In this state, no energy is transferred and no data are interchanged. Energy is transferred in RFID tags by means of induction using the effective area enclosed by the antenna. In the present refinement, the antenna 5 is guided along the outer edge of the apparatus in a few turns. Folding, for example along the dashed line 6—but many other fold lines are possible, minimizes this area enclosed by the antenna coil and thus minimizes the transfer of energy, with the result that the method of operation intended for the RFID tag is no longer ensured. As a result of unfolding, energy is then supplied again and data are transferred bidirectionally using the antenna coil.

Figure 2:
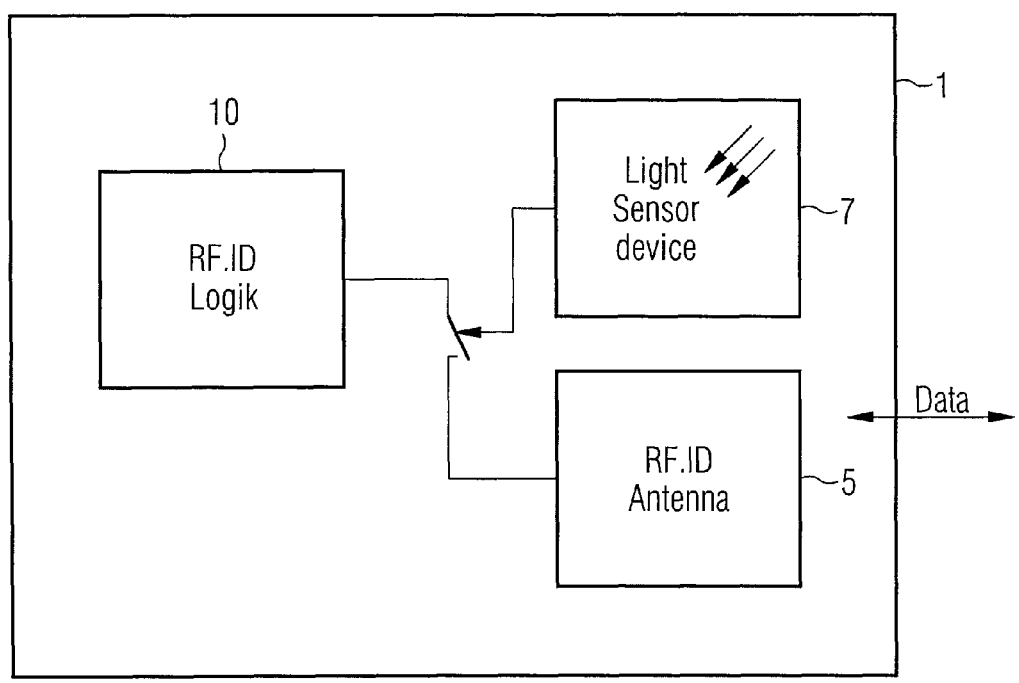
FIG. 2 shows a basic illustration of an inventive data storage medium having a light sensor.

As shown in FIG. 2, a data storage medium 1 according to another embodiment has an antenna coil 5 for supplying energy and for bidirectional data traffic, a semiconductor chip 10 which is connected to the antenna coil, and a light sensor 7 which acts as a switch. The light sensor 7 is advantageously designed in such a manner that it establishes the connection between the semiconductor chip and the antenna coil when light is incident and the apparatus is thus supplied with energy. As a result, data transmission can be deactivated or blocked in a form state. In a particularly advantageous refinement, this is effected by virtue of the apparatus comprising opaque material and by virtue of part of the apparatus covering the light sensor 7 in a folded form state, with the result that light incidence on the light sensor 7 and thus data transfer are enabled by unfolding the apparatus.

Figure 3:
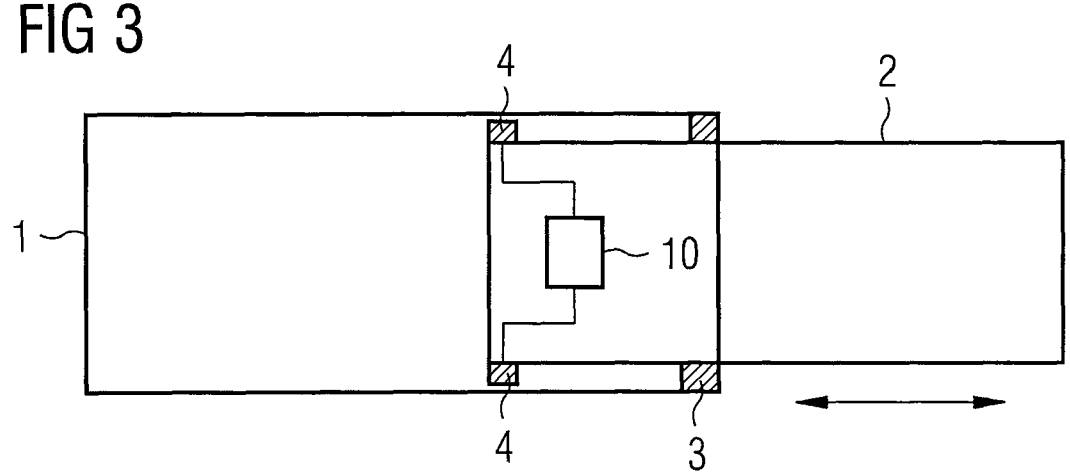
FIGS. 3, 4, 5 show different views of the basic illustrations of an inventive data storage medium having outer and inner envelope sections.
Figure 4:
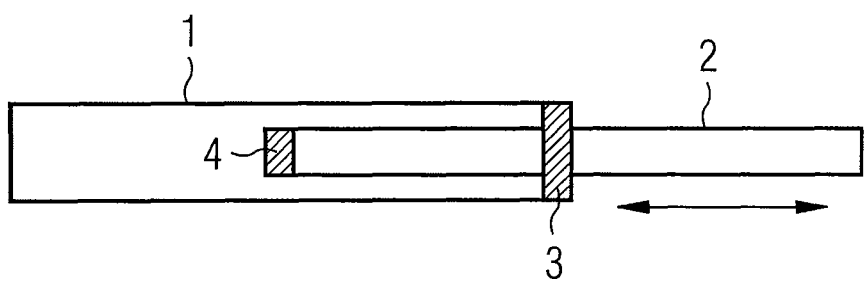

As shown in FIGS. 3 and 4, a data storage medium according to a yet another embodiment comprises two envelope sections, an outer section 1 and an inner section 2. The inner section 2 can be pushed into the outer section 1 or pulled out of the latter, as represented by the arrow. The inner section 2 has contacts 4. These contacts 4 are expediently fitted to the outer and inner envelope sections in such a manner that they prevent the inner envelope section 2 from being completely pulled out by virtue of the contacts 3 of the outer section acting almost as "stoppers" for the contacts 4 of the inner section. At the same time, an electrical connection is produced between the contacts 3, 4 when the inner envelope section is pulled out until the contacts 3, 4 touch. The antenna coil and the semiconductor chip are connected to the contacts 3, 4 in a suitable manner. Contact-connection supplies the semiconductor chip with energy via the contact-connected antenna coil 5. Bidirectional data transfer can take place.

Figure 5:
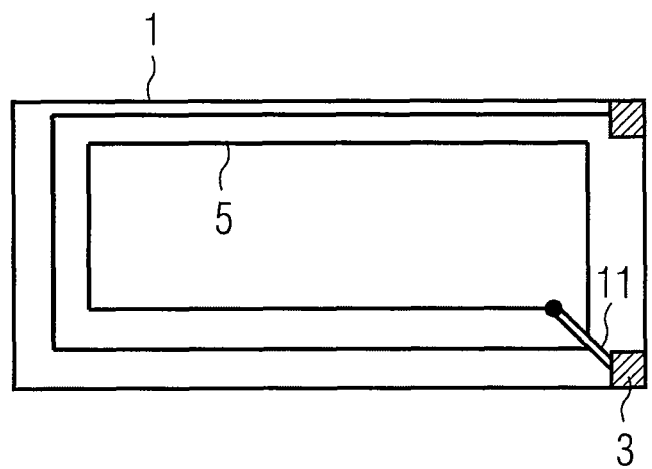

FIG. 5 shows the outer envelope section 1 with the integrated antenna coil 5 and a contact bridge 11 for connecting the antenna coil 5 to one of the contacts 3.

What is claimed is:

1. A data storage card that wirelessly transmits data, the data storage card comprising:

an envelope section and an internal section which can be displaced relative to the envelope section and is at least partially arranged in the envelope section, the envelope section comprising an antenna and contacts which are connected to the antenna, wherein when the internal section has been pulled out relative to the envelope section, the contacts of the envelope section connect to contacts of the internal section, and the contacts of the internal section are connected to a transmission device of the data storage card, to thereby enable wireless transmission of data, and wherein when the internal section has been pushed in relative to the envelope section, wireless transmission of data is blocked.

2. The data storage card as claimed in claim 1, wherein the data storage card comprises an energy receiving antenna for operating the data storage card.

3. The data storage card as claimed in claim 2, wherein the data storage card is supplied solely with energy induced by the energy receiving antenna, and bidirectional data interchange occurs simultaneously.

4. The data storage card as claimed in claim 1, wherein the data storage card is configured to store personal data.

5. The data storage card as claimed in claim 1, wherein the data storage card comprises a contactless cash card function.

6. The data storage card as claimed in claim 1, wherein the data storage card comprises readable information which is covered by the envelope section when the internal section has been pushed into the envelope section during which wireless transmission of data is blocked.

7. The data storage card as claimed in claim 1, wherein the contacts of the envelope section and the contacts of the internal section are fitted such that the contacts of the envelope section act as stoppers for the contacts of the internal section, thereby preventing the internal section from being completely pulled out from the envelope section.

\* \* \* \* \*